(12) United States Patent
Droz

(10) Patent No.: US 10,040,308 B2
(45) Date of Patent: Aug. 7, 2018

(54) CARD INCORPORATING A VISIBLE VALUABLE OBJECT

(71) Applicant: FINE SWISS METALS AG, Kriens (CH)

(72) Inventor: Francois Droz, Corcelles (CH)

(73) Assignee: FINE SWISS METALS AG, Kriens (CH)

( * ) Notice: Subject to any disclaimer, the term of this patent is extended or adjusted under 35 U.S.C. 154(b) by 124 days.

(21) Appl. No.: 13/791,181

(22) Filed: Mar. 8, 2013

(65) Prior Publication Data

US 2013/0247432 A1    Sep. 26, 2013

(30) Foreign Application Priority Data

Mar. 26, 2012    (EP) .................................... 12161347

(51) Int. Cl.
| | |
|---|---|
| *G09F 1/00* | (2006.01) |
| *B42D 15/02* | (2006.01) |
| *B32B 37/18* | (2006.01) |
| *A44C 15/00* | (2006.01) |

(52) U.S. Cl.
CPC ............ *B42D 15/027* (2013.01); *A44C 15/00* (2013.01); *B32B 37/185* (2013.01); *B32B 2305/34* (2013.01); *B32B 2311/02* (2013.01); *B32B 2311/04* (2013.01); *B32B 2425/00* (2013.01)

(58) Field of Classification Search
CPC ..................................... G09F 1/00; G09F 1/04
See application file for complete search history.

(56) References Cited

U.S. PATENT DOCUMENTS

| | | | |
|---|---|---|---|
| 2,088,567 | A | 8/1937 | Ballou |
| 2,128,793 | A | 8/1938 | Bondy |
| 2,410,845 | A | 11/1946 | Snell et al. |
| 3,287,839 | A | 11/1966 | Rotwein |

(Continued)

FOREIGN PATENT DOCUMENTS

| | | |
|---|---|---|
| CN | 201020959 Y | 2/2008 |
| CN | 101473338 A | 7/2009 |

(Continued)

OTHER PUBLICATIONS

European Search Report issued in corresponding application EP 12 16 1347, completed Aug. 29, 2012.

(Continued)

*Primary Examiner* — Kristina N S Junge
(74) *Attorney, Agent, or Firm* — Cahn & Samuels, LLP

(57) ABSTRACT

The card forming a support for a valuable object, particularly a small precious metal ingot incorporated in said card, includes a core with a through aperture in which said valuable object is arranged, said through aperture having larger dimensions than those defined by the contour of said valuable object in the main geometric plane of said card. This valuable object is located in a central area of the through aperture so that a transparent peripheral area surrounds the valuable object inside said through aperture. The valuable object is embedded in a transparent resin which entirely fills the area peripheral to said valuable object between said object and the contour of the through aperture, so that the space remaining in the aperture around the valuable object is entirely filled by the resin.

16 Claims, 3 Drawing Sheets

(56) References Cited

U.S. PATENT DOCUMENTS

| | | | |
|---|---|---|---|
| 3,312,197 A * | 4/1967 | Smith | 40/358 |
| D222,516 S | 10/1971 | Kelson | |
| 3,668,795 A | 6/1972 | Barker | |
| D233,068 S | 10/1974 | Bringas | |
| 4,466,534 A | 8/1984 | Dunn | |
| 4,612,436 A | 9/1986 | Okada | |
| 4,667,087 A | 5/1987 | Quintana | |
| 4,778,982 A | 10/1988 | Beech et al. | |
| 4,812,633 A | 3/1989 | Vogelgesang et al. | |
| 4,931,629 A | 6/1990 | Frankfurt | |
| 4,968,873 A | 11/1990 | Dethloff et al. | |
| 4,999,617 A | 3/1991 | Uemura et al. | |
| 5,145,538 A * | 9/1992 | Yamaguchi | 156/69 |
| 5,359,183 A | 10/1994 | Skodlar | |
| D368,276 S | 3/1996 | Buzby | |
| 5,530,235 A | 6/1996 | Stefik et al. | |
| 5,734,154 A | 3/1998 | Jachimowicz et al. | |
| 5,789,733 A | 8/1998 | Jachimowicz et al. | |
| 5,844,230 A | 12/1998 | Lalonde | |
| 6,003,770 A | 12/1999 | Schilling | |
| 6,006,456 A | 12/1999 | Hiromachi et al. | |
| 6,019,284 A | 2/2000 | Freeman et al. | |
| 6,036,099 A | 3/2000 | Leighton | |
| 6,076,675 A * | 6/2000 | Pawlowski | 206/459.5 |
| D429,733 S | 8/2000 | Jones et al. | |
| 6,128,840 A * | 10/2000 | Boisvert | 40/124.191 |
| D436,991 S | 1/2001 | Morgante | |
| 6,482,495 B1 * | 11/2002 | Kohama et al. | 428/67 |
| 6,514,367 B1 | 2/2003 | Leighton | |
| 6,631,849 B2 | 10/2003 | Blossom | |
| 6,635,143 B2 * | 10/2003 | Zurawski et al. | 156/280 |
| 6,832,730 B2 | 12/2004 | Conner et al. | |
| 6,926,794 B2 | 8/2005 | Kohama et al. | |
| 6,991,155 B2 | 1/2006 | Burchette, Jr. | |
| 7,036,739 B1 | 5/2006 | Mann et al. | |
| 7,080,783 B2 | 7/2006 | Dilday et al. | |
| D534,913 S | 1/2007 | Wilcox | |
| 7,213,749 B2 | 5/2007 | Webb et al. | |
| D582,977 S | 12/2008 | Field et al. | |
| 7,487,908 B1 | 2/2009 | Cook et al. | |
| 7,728,931 B2 | 6/2010 | Hoffmuller | |
| 7,793,834 B2 | 9/2010 | Hachey et al. | |
| D632,330 S | 2/2011 | Qiao et al. | |
| D632,734 S | 2/2011 | Qiao et al. | |
| 7,986,459 B2 | 7/2011 | Kaule et al. | |
| 7,988,036 B2 | 8/2011 | Cook, Jr. et al. | |
| 8,118,230 B2 | 2/2012 | Selg et al. | |
| 8,136,725 B2 | 3/2012 | Yamazaki | |
| 8,149,511 B2 | 4/2012 | Kaule et al. | |
| 8,276,945 B2 | 10/2012 | Heim et al. | |
| D680,585 S | 4/2013 | Ahmad et al. | |
| 8,528,824 B2 | 9/2013 | Droz | |
| 8,534,710 B2 | 9/2013 | Hoffmuller et al. | |
| 8,613,471 B2 | 12/2013 | Heim | |
| 8,685,488 B2 | 4/2014 | Hoffmuller et al. | |
| 8,725,589 B1 | 5/2014 | Skelding et al. | |
| 8,771,803 B2 | 7/2014 | Dichtl | |
| 8,962,065 B2 | 2/2015 | Dalal et al. | |
| 8,968,856 B2 | 3/2015 | Hoffmuller et al. | |
| 9,004,540 B2 | 4/2015 | Rahm et al. | |
| 9,007,669 B2 | 4/2015 | Heim | |
| 9,274,258 B2 | 3/2016 | Fuhse et al. | |
| D759,022 S | 6/2016 | Beals et al. | |
| 9,399,366 B2 | 7/2016 | Hoffmuller et al. | |
| D765,177 S | 8/2016 | Hewitt et al. | |
| 9,430,727 B2 | 8/2016 | Mann et al. | |
| D786,355 S | 5/2017 | Hendrick | |
| 9,697,456 B2 | 7/2017 | Gregarek et al. | |
| D797,188 S | 9/2017 | Hendrick | |
| D798,385 S | 9/2017 | Yoo et al. | |
| 2003/0037875 A1 | 2/2003 | Kohama et al. | |
| 2006/0278539 A1 * | 12/2006 | Fager | 206/0.82 |
| 2007/0047037 A1 | 3/2007 | Yoshizawa et al. | |
| 2007/0246933 A1 | 10/2007 | Heim et al. | |
| 2007/0251999 A1 | 11/2007 | Bohlke et al. | |
| 2010/0012731 A1 | 1/2010 | Droz | |
| 2011/0169208 A1 | 7/2011 | Almeda et al. | |
| 2012/0067746 A1 | 3/2012 | Gremaud et al. | |
| 2017/0124445 A1 | 5/2017 | Howard | |

FOREIGN PATENT DOCUMENTS

| | | |
|---|---|---|
| GB | 2 218 044 A | 11/1989 |
| JP | H03288698 A | 12/1991 |
| JP | 04090392 A | 3/1992 |
| JP | H4035563 U | 3/1992 |
| JP | 5-64861 A | 3/1993 |
| JP | 08034182 A | 2/1996 |
| JP | 8-108669 A | 4/1996 |
| JP | 2707068 B2 | 1/1998 |
| JP | H10129165 A | 5/1998 |
| JP | H10166771 A | 6/1998 |
| JP | 3024838 B2 | 3/2000 |
| JP | 2010501910 A | 1/2010 |
| KR | 1020100116754 A | 11/2010 |
| TW | M274593 U | 9/2005 |

OTHER PUBLICATIONS

English Abstract of CN 101473338, Jul. 1, 2009.
English Abstract of CN 201020959, Feb. 13, 2008.
English Abstract of JP 2707068, Jan. 28, 1998.
English Abstract of JP 3024838, Mar. 27, 2000.
English Abstract of JP 2010501910, Jan. 21, 2010.
English Abstract of JP H03288698, Dec. 18, 1991.
English Abstract of JP 04090392, Mar. 24, 1992.
English Abstract of JP 08034182, Feb. 6, 1996.
English Abstract of JP H10129165, May 19, 1998.
English Abstract of JP H10166771, Jun. 23, 1998.
English Abstract of KR 1020100116754, Nov. 2, 2010.
Japanese Office Action in JP Patent Application No. 2013-063520 dated Feb. 2014.
Machine English translation Japanese Office Action in JP Patent Application No. 2013-063520 dated Feb. 2014.
Taiwan IPO Search Report in Application No. 102110289 dated Jul. 2016.

\* cited by examiner

CARD INCORPORATING A VISIBLE VALUABLE OBJECT

This application claims priority from European Patent Application No. 12161347.5 filed Mar. 26, 2012, the entire disclosure of which is incorporated herein by reference.

FIELD OF THE INVENTION

The present invention concerns a card incorporating a visible valuable object. The card forms a substrate or support for this valuable object. In particular, the valuable object is a small precious metal ingot or a valuable coin or piece. A "valuable coin or piece" means not only a coin or piece made of relatively expensive material, but also, for example, a commemorative piece, a medal or one or several jewels or gems.

The card, in bank card format and having a thickness which may be greater than the ISO standard for bank cards, is used for example as an advertising medium or simply as a support for a valuable object given to a client, employee, sports person, the winner of a game, etc.

BACKGROUND OF THE INVENTION

It is known to place a small gold ingot of between 1 and 10 grammes in a cavity made in the body of a plastic card. In a first variant the card body has a through aperture the profile of which substantially fits that of the ingot. In another variant, the dimensions of the through aperture are larger than those of the ingot. Two transparent plastic sheets are laminated respectively on the two surfaces of the pierced card body. The ingot is thus confined between the two plastic sheets. To hold the ingot in a substantially central position in the aperture, a flange or raised portion forming a frame is provided on one or both plastic sheets. The frame is obtained for example by thermoforming. It may also be affixed to one or both of the plastic sheets. This frame surrounds the ingot so that the latter remains in a substantially central position in the aperture. In particular, the two plastic sheets are welded together along the frame so as to form a closed pouch for the ingot. A transparent peripheral area is therefore obtained around the ingot. However, the thick frame inside the aperture is visible and unattractive. Although transparent, the frame causes a visual deformation and prevents the side surface of the ingot from being properly seen. Moreover, the two plastic sheets can easily be deformed in the aperture area at the periphery of the transparent frame. In this area, and in the pouch where the ingot is located, air is generally trapped between the two plastic sheets. The card is not, therefore, compact and it is possible for the ingot to be handled such that it moves out of the plane of the card body. Consequently, the card can easily be damaged and is of limited longevity.

SUMMARY OF THE INVENTION

It is an object of the present invention to provide a high quality card incorporating a valuable object, in particular, a small precious metal ingot or a valuable coin or piece, which displays the valuable object in a perfectly visible manner from all sides, i.e. in its entire three dimensional shape.

The present invention therefore concerns a card forming a support for a valuable object incorporated in the card and including a card body or core with a through aperture in which the valuable object is arranged, the dimensions of said through aperture being larger that those defined by the contour of said valuable object in the main geometric plane of the card. This card also includes at least two transparent films respectively arranged on both sides of the card body or core and respectively covering one side and the other of the valuable object, said valuable object being located in a central area of the through aperture so that there is a transparent peripheral area surrounding the object inside the through aperture. This card is characterized in that the valuable object is embedded in a transparent resin which completely fills the area surrounding the valuable object between the periphery of the through aperture and the valuable object so that the space remaining in the aperture around the valuable object is completely filled by the resin.

The present invention also concerns a method of manufacturing at least one card, forming a support for a valuable object incorporated in said card, which includes the following steps:

A) Taking a card body or core in the form of a plastic sheet having at least one through aperture.

B) Placing at least one valuable object respectively in said at least one through aperture, each valuable object having smaller dimensions than the corresponding aperture and being placed in said aperture so as to leave a visible peripheral area around said object which enables said object to be seen on all sides, each valuable object being held in a central area of the corresponding aperture by a permanent or temporary securing means or by a permanent or temporary positioning means.

C) Providing a transparent resin in each aperture so as to fill the space remaining around the valuable object placed therein.

D) Arranging an at least partially transparent first film and second film respectively on both sides of the card body or core, said two films covering the transparent resin and each valuable object.

Other particular features of the invention will be set out below in the detailed description of the invention.

BRIEF DESCRIPTION OF THE DRAWINGS

The invention will be described below with reference to the annexed drawings, given by way of non-limiting example, and in which.

DETAILED DESCRIPTION OF THE INVENTION

Figure 1:
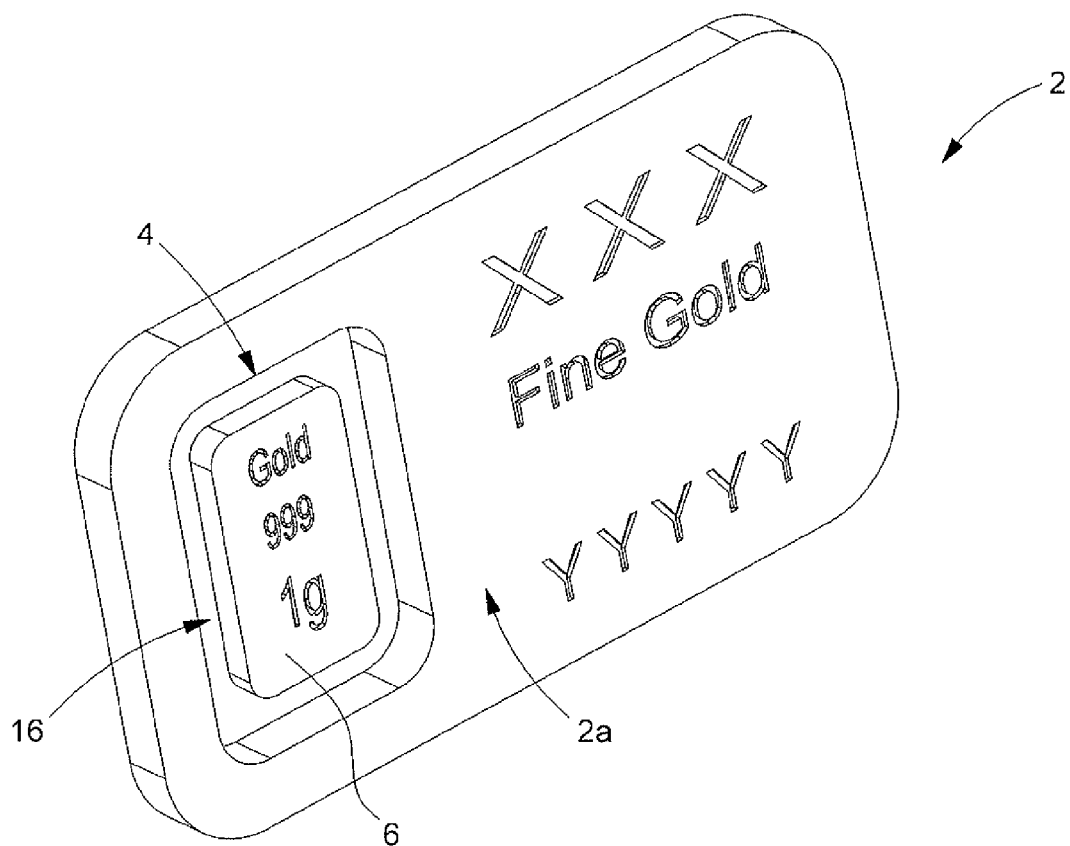
FIG. 1 is a perspective view of a card according to the invention which incorporates a small precious metal ingot in an aperture of larger dimensions.

A card 2 according to the invention, forming a support for a valuable object 6 incorporated in said card, will be described below with reference to FIGS. 1 and 2. In the variant shown in the Figures, the valuable object is a small gold ingot which forms a flat object with a top surface 6*a* and a bottom surface 6*b*. Card 2 includes a card body or core 8 with a through aperture 4 in which the small gold ingot is arranged. The through aperture has larger dimensions than those defined by the contour of the ingot in the main geometric plane of the card which is parallel to the top surface 2a and bottom surface 2b thereof.

The card also includes at least two transparent films 12 and 14 respectively arranged on the two sides of the card body or core 8. These two films respectively cover the top and bottom surfaces of ingot 6. This ingot is located in a central area of through aperture 4 and a transparent peripheral area 16 is arranged around the ingot inside the through aperture. This transparent peripheral area is homogeneous and has, in particular, a width substantially equal to or greater than a millimeter (1 mm). It forms an aperture in card 2 making the card see-through in peripheral area 16. It will be noted that the gold ingot thus appears to be floating in the air in the middle of the aperture in the card body. It is therefore easy to see the gold ingot on all sides. The valuable object may thus be properly seen in three dimensions, i.e. it is easy to appreciate the volume thereof.

According to the invention, the gold ingot is embedded in a transparent resin 10 which entirely fills the area 16 peripheral to said gold ingot. A "resin" includes, in particular, an adhesive. The peripheral area extends between the external contour of the ingot and the periphery of the through aperture, in other words between the lateral surface of the ingot and the wall of through aperture 4. As a result, the space remaining in this through aperture around the ingot is entirely filled by the resin. It will be noted that the ingot may be formed of any precious metal. In other variants, the valuable object is a flat coin or piece, a small medal, a small work of art, a jewel or gem, etc.

Figure 2:
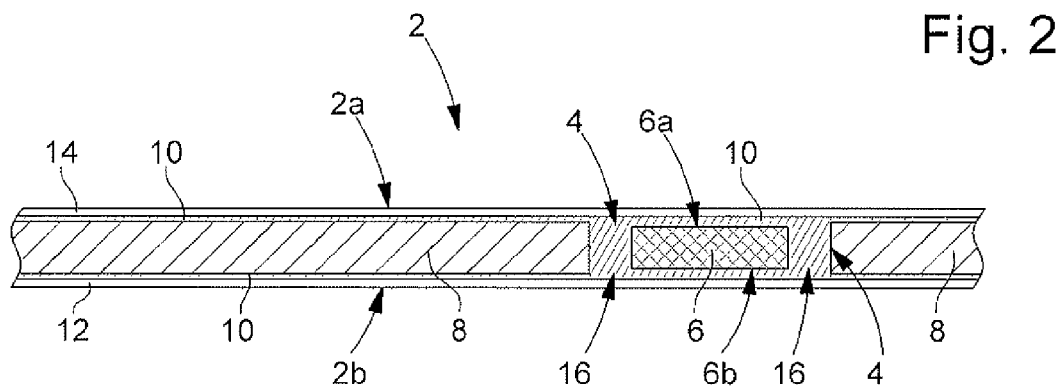
FIG. 2 is a partial cross-section of a card according to the invention obtained via the first or second implementation of a manufacturing method according to the invention.
Figure 3A:
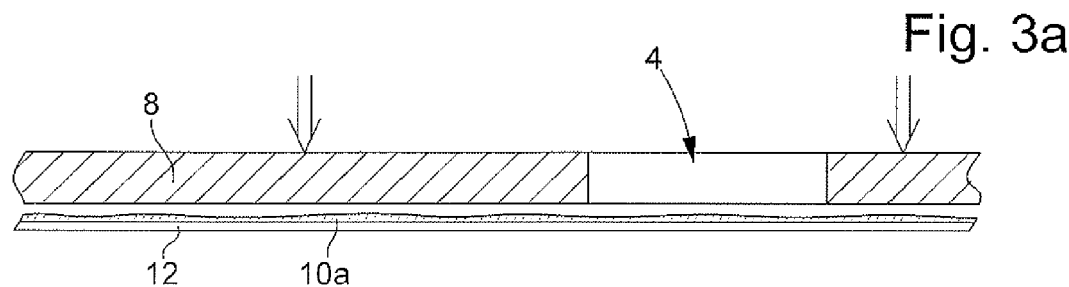
FIGS. 3*a* to 3*d* show various steps of a first implementation of a method according to the invention of manufacturing a card forming a support for a valuable object.
Figure 3B:
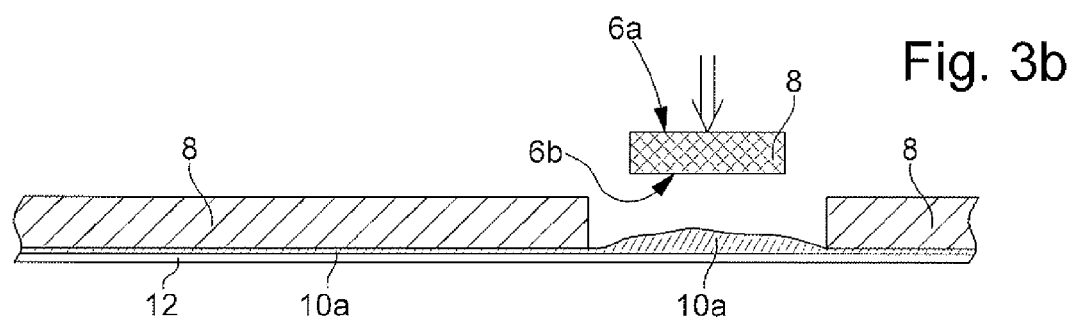
Figure 3C:
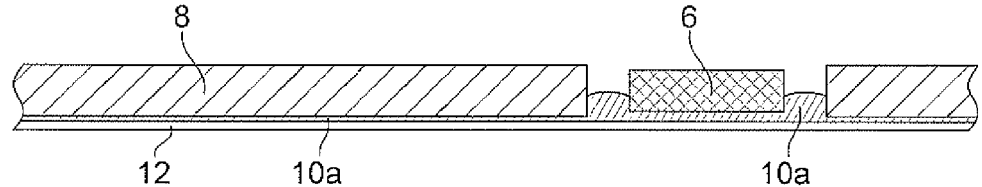
Figure 3D:
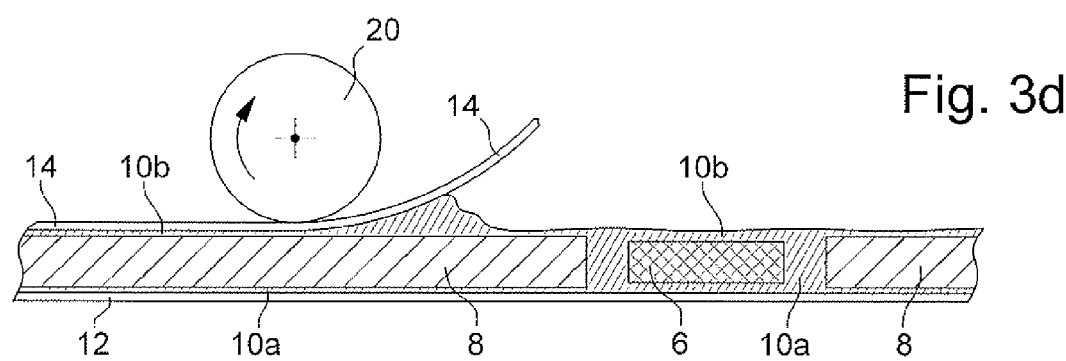

According to the preferred variant shown in FIG. 2, resin 10 also covers the top surface 6a and the bottom surface 6b of the small precious metal ingot. Thus, the ingot is entirely covered by the resin which forms an adherent interface between the ingot and the two transparent external films 12 and 14. The resin thus fills any space remaining in aperture 4 and forms a rigid or semi-rigid mass between the two transparent films which each have, in the area of through aperture 4, a flat surface in the continuity of top surface 2a, respectively bottom surface 2b of the card. The resin preferably has a certain elastic deformation capacity. Moreover, resin 10 is also spread over both surfaces of core 8 and forms two adherent films respectively between the core and the two transparent external films 12 and 14. The card according to this preferred variant thus has two entirely flat external surfaces 2a and 2b and the card does not have any air pockets. It is compact and solid.

Generally, the invention also concerns a method of manufacturing at least one card forming a support for a valuable object incorporated therein, said method including the following steps:

A) A card body or core 8 is provided in the form of a plastic sheet having at least one through aperture 4.

B) A valuable object 6 is placed in through aperture 4, said valuable object having smaller dimensions than said aperture, and it is placed in the aperture so as to leave a visible peripheral area 16 around said object; which allows the valuable object to be seen on all sides in the card manufactured as explained above. The valuable object, in particular a small ingot, is held in a central area of the through aperture by a permanent or temporary securing means or by a permanent or temporary positioning means.

C) A transparent resin is placed at least in the through aperture so as to fill the space remaining around the valuable object placed therein.

D) An at least partially transparent first film and second film are respectively arranged on both sides of the card body or core, said two films covering the transparent film and the valuable object.

It will be noted that all the elements are provided in the manufacturing facility, which includes at least one work bench or surface. It will be noted that the steps of the aforementioned method may include sub-steps occurring at different times during the manufacture of the card incorporating the valuable object. Thus the above steps are not necessarily successive steps as will become clear, in particular, in the second implementation which will be described below. In particular, the resin can be added in part several times. The permanent securing means is, for example, formed by the resin, which may be formed of various materials and specific adhesives. In a variant which is not shown, this securing means may include a permanent means for positioning the valuable object in the central area of the aperture. For example, thin arms are arranged projecting from the periphery of the aperture towards the central area, said thin arms forming part of the core of the card. The arms may be made when the aperture is cut out. Two vertical and two horizontal arms may be provided respectively starting from the middle of the four sides defined by the periphery of the aperture. The temporary securing means may be formed by a low adherent adhesive, a silicon paste, etc. The temporary positioning means may be formed by a fitting device, work pins or by a gripping or picking arm for the valuable object which has been used for bringing and placing the object in the aperture, then finally for holding the object in the central area until part of the resin placed in the through aperture has at least partially solidified. It will be noted that the resin can be placed in the aperture before or after the valuable object is placed in the aperture, and deposited in peripheral area 16. Those skilled in the art may devise several variants for positioning and holding the valuable object in the desired position during the manufacture of the card, at least until at least part of resin 10 placed in the through aperture has hardened sufficiently to be able to position and hold said valuable object itself in the central area of the through aperture.

It will be noted that the method according to the invention advantageously provides for the batch manufacture of cards. Thus, a plastic sheet of a certain thickness is provided, selected, in particular, according to the thickness of the valuable object concerned, and having a plurality of through apertures in which a plurality of valuable objects are respectively placed. The resin is added simultaneously for all the cards being manufactured. The transparent external films are also provided with substantially the same dimensions as the plastic sheet. A final cutting step is provided in order to obtain the individual cards. It will also be noted that the plastic sheet and/or plastic films may include various patterns, prints and/or security elements and/or information relating to the valuable object. In particular, at least one of the transparent films is suitable for laser printing.

A first implementation of the method of manufacturing cards each forming a support for a valuable object will be described below with reference to FIGS. 3a to 3d. The method of manufacturing one card will be described below, but the same method can easily be applied to the batch manufacture of several cards, as indicated above.

Transparent film 12 with a first part 10a of the resin on the top surface thereof are placed in a press and core 8 with through aperture 4 is placed on top. The core may evidently be placed on the resin before the assembly is placed in the press to carry out the assembling operation. In a preferred variant, a roller press is used to carry out the assembling operation. This removes the presence of air bubbles between the transparent film and the core. While the first part 10a of the resin is still sufficiently liquid (viscous liquid state) to allow penetration, the small ingot 6 is added, by means of a gripping or picking tool provided, for example, with a suction system for holding the ingot by vacuum, and the ingot is deposited in the central area of aperture 4, preferably pressing on the resin present at the bottom of the aperture. Then, the first part of the resin is hardened to ensure the ingot is held in its initial position in the subsequent step. If necessary, the gripping or picking tool continues to hold the ingot until the resin is sufficiently rigid to hold the ingot in the desired position itself. When the resin is a thermosetting adhesive, heat may be provided to accelerate the polymerising of the adhesive during this phase. In another variant where the solidified resin can easily be melted again, resin 10a has already almost entirely solidified when the ingot is added. Since this ingot is formed of precious metal, it is heated prior to penetrating resin 10a and melts the resin locally, causing said resin to deform as a result of the pressure exerted on the ingot. In another variant, resin 10a may be melted locally at the bottom of the aperture just before the ingot is provided and partially penetrates the resin.

Once the ingot is held in a sufficiently rigid manner by the first part of the solidified resin, a second part 10b of the resin is placed on the top surface of core 8 and in aperture 4, particularly on the ingot. This resin is preferably deposited in the form of parallel strands initially separated by grooves for the efficient removal of any residual air. The second transparent film 14 is then applied above using a roller press 20. After the second part of the resin has solidified, a card 2 according to the invention is obtained. The resin and the transparent films ensure that the ingot can be seen perfectly on all sides and zone 16 peripheral to said ingot is completely see through. The surface state of the card is of high quality, comparable to standards required for bank cards.

According to variants of the first implementation, the first part of the adhesive is either deposited directly onto a non-adherent work surface (for example made of silicon or Teflon®), or a non-adherent work sheet (silicon paper or a PE sheet) is provided and the first part of the resin is deposited on top. Likewise, to spread and fill the remaining space in aperture 4, a second work sheet can be used. Once resin 10a and 10b has solidified, an intermediate product is thus obtained. In order to finish the card, the two removable work sheets, which can easily be separated from the resin, are removed, and the two transparent films are applied to either side of the intermediate product. In order to do so, a press or roller presses can be used and a hot melt adhesive film or adhesive is advantageously provided in liquid form in order to assemble the transparent films to the intermediate product, which increases the flatness of the card. In another variant, the transparent external films are simply thermo-compressed against the two surfaces of the intermediate product.

With reference to FIGS. 4a to 4e, a second implementation of the manufacturing method according to the present invention will be described below.

Figure 4A:
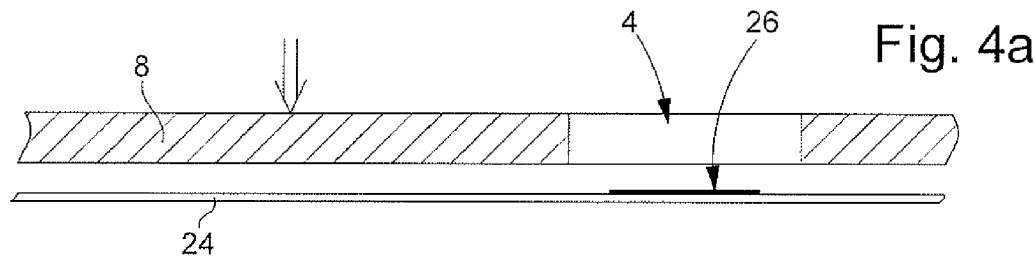
FIGS. 4*a* to 4*e* show various steps of a second implementation of a method according to the invention of manufacturing a card forming a support for a valuable object.
Figure 4B:
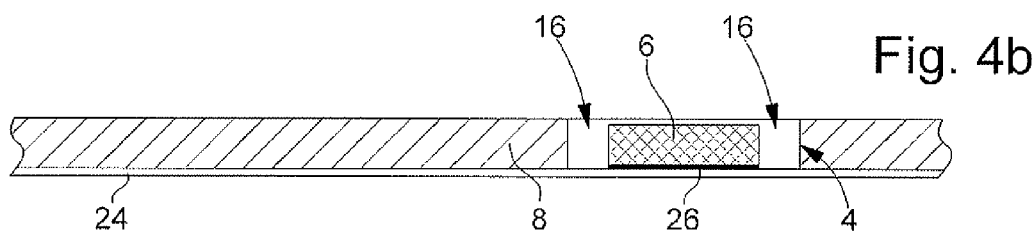
Figure 4C:
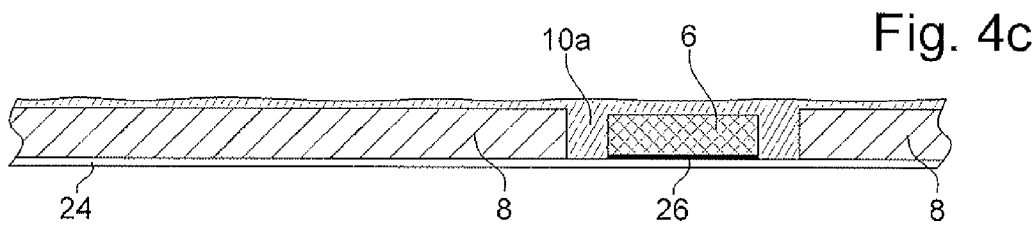
Figure 4D:
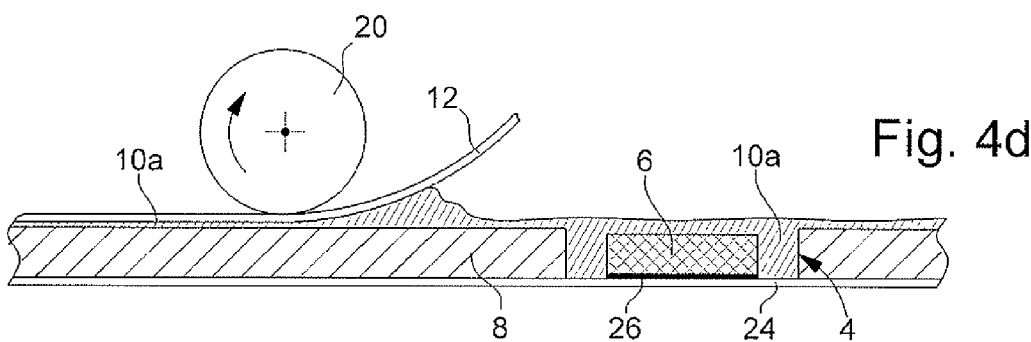
Figure 4E:
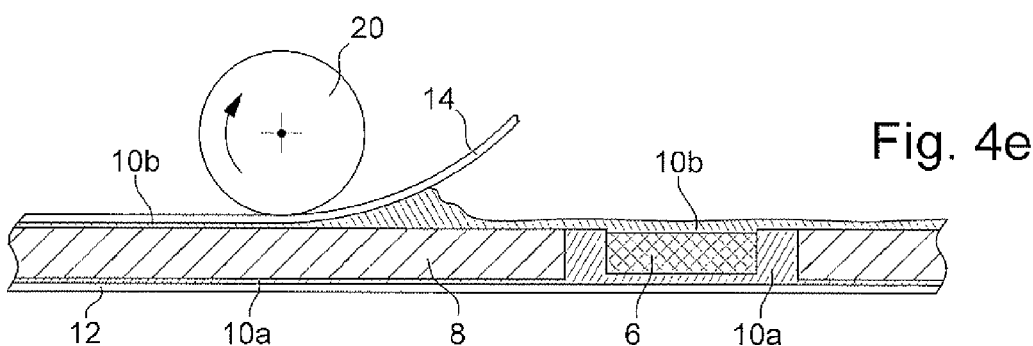

A work sheet 24 is first of all placed on a work surface and the card body or core 8 is placed on top and held in a stable position relative to said work sheet. A low adherent adhesive 26, forming a means of temporarily fixing the ingot to the work sheet, is arranged on said work sheet at least in the region of the central area of through aperture 4. In a variant, this low adherent adhesive is deposited on the bottom surface of the ingot which is then placed in said through aperture. It will be noted that instead of the low adherent adhesive, a paste or flexible film which adheres slightly to the ingot or matches the relief of said ingot may be provided to hold said ingot in place in the steps of FIGS. 4c and 4d. Next, a first part 10a of the resin is added at least in the through aperture. In a variant shown in FIG. 4d, transparent film 12 is placed on this first resin part and applied using a press or roller 20. After this first resin part 10a has solidified, the assembly obtained is turned over and work sheet 24 and the low adherent adhesive 26 are removed. Finally, as shown in FIG. 4e, a second part 10b of the resin is placed at least on ingot 6 and transparent film 14 is placed on the assembly and applied using a press or roller 20.

In this second implementation, several variants are possible. Thus, in one variant, instead of transparent film 12 in the step of FIG. 4d, a second work sheet with low adherence to the resin is used to spread said resin in a uniform manner and to fill the space remaining in aperture 4. In another variant, the step of FIG. 4e may also be achieved using a low-adherent work sheet. An intermediate product is thus obtained with two substantially flat surfaces after the work sheets have been removed. Therefore, the two transparent external films can be subsequently applied to the two sides of the intermediate product, as described with reference to the first implementation. It will be noted that it is also possible to envisage introducing a security element, for example an official stamp or hologram into, underneath or on top of the resin arranged between the card body or core and a transparent external film.

What is claimed is:

1. A card forming a support for a valuable object incorporated into the card, the card comprising:
   (a) the valuable object;
   (b) a core or body, wherein the core or body has two sides and a through aperture, wherein the valuable object is arranged in the through aperture, and wherein the through aperture has larger dimensions in a main geometric plane of the card than those defined by a contour of the valuable object;
   (c) at least two transparent films respectively arranged on the two sides of the core or body of the card,
   wherein the two transparent films respectively cover both sides of the valuable object that are seen through the through aperture,
   wherein the valuable object is located in a central area of the through aperture so that a transparent peripheral area surrounds the valuable object inside the through aperture and an entire 3D shape of the valuable object is visible,
   wherein the valuable object is permanently embedded in a transparent resin that completely fills the peripheral area to the valuable object between the object and a contour of the through aperture so that the transparent peripheral area around the valuable object is completely filled by the resin.

2. The card according to claim 1, wherein the valuable object is a small precious metal ingot or a valuable coin or piece, and wherein the resin also covers a top surface and a bottom surface of the small precious metal ingot or the valuable coin or piece, thereby forming an interface between the valuable object and the two transparent films.

3. The card according to claim 1, wherein, at least in an area comprising the through aperture, the two transparent films have entirely flat external surfaces.

4. The card according to claim 1, wherein the transparent resin covers a top surface and a bottom surface of the valuable object and is spread over both sides of the core or body, so the transparent resin forms an adherent interface between the at least two transparent external films and the valuable object and forms two adherent films between the at least two transparent films and the core or body, the resin filling any space remaining in aperture and forming a rigid or semi-rigid mass between the at least two transparent films.

5. The card according to claim 1, wherein the at least in an area of said through aperture, the two transparent films have entirely flat external surfaces in continuity with a top surface and a bottom surface of the card, respectively.

6. The card according to claim 1, wherein the two transparent films are of substantially the same dimension as the card body.

7. A method of manufacturing at least one card according to claim 1 comprising:
  A) Taking a card body or core in the form of a plastic sheet having at least one through aperture;
  B) Placing at least one valuable object respectively in said at least one through aperture, each valuable object having smaller dimensions than the corresponding aperture and being placed in said aperture so as to leave a visible peripheral area around said object which enables said object to be seen on all sides, each valuable object being held in a central area of the corresponding aperture by a permanent securing means or by a permanent positioning means;
  C) Providing a transparent resin in each aperture so as to fill the space remaining around the valuable object placed therein; and
  D) Arranging an at least partially transparent first film and second film respectively on both sides of the card body or core, said two films covering the transparent resin and each valuable object.

8. The manufacturing method according to claim 7, wherein:
  a first part of said resin is first placed on a work surface or a work sheet to which said resin does not adhere or on said first film;
  then said card body or core and said at least one valuable object are placed on said first part of said resin;
  then, after said first part of the resin has at least partially solidified, a second part of said resin is placed on said card body or core and on said valuable object; and
  finally said second film is placed on the second part of the resin, and, if not provided prior to the addition of said first part of the resin, said first film is placed on said first part of the resin, said first and second films being applied with pressure against the card body or core.

9. The manufacturing method according to claim 8, wherein said card body or core and said work sheet or said first film are assembled by the first part of said resin, with an application of pressure, prior to the addition of said at least one valuable object in said at least one through aperture.

10. The manufacturing method according to claim 7, wherein:
  a work sheet is first provided and said card body or core is placed on top thereof and held in a stable position relative to said work sheet,
  wherein a low adherent film forming a means of temporarily securing said at least one valuable object to the work sheet is provided either on said work sheet at least in the area of said at least one through aperture, or on the bottom surface of said at least one valuable object, said valuable object being then respectively placed in said at least one through aperture,
  wherein a first part of the resin is then placed at least in said at least one through aperture, and wherein, after said first resin part has solidified, the assembly obtained is turned over and said work sheet and said low adherent adhesive are removed, and
  finally a second part of said resin is placed at least on said at least one valuable object.

11. The manufacturing method according to claim 10, wherein said first film is placed on said first resin part and is applied using a press or a roller, and wherein then said second film is placed on said second resin part and is applied using a press or a roller.

12. A card, comprising:
  a body comprising a plastic sheet having two sides and a through aperture;
  a valuable object located in a central area of the through aperture, so that a transparent peripheral area surrounds the valuable object inside the through aperture and an entire three dimensional shape of the valuable object is visible;
  at least two transparent films respectively arranged on the two sides of the body and that cover both sides of the valuable object as seen through the through aperture,
  wherein the valuable object is embedded in a rigid mass of transparent resin that completely fills the transparent peripheral area such that the valuable object appears to float in the central area of the through aperture.

13. A card according to claim 12, wherein, at least in an area comprising the through aperture, the two transparent films have entirely flat external surfaces.

14. The card according to claim 12, wherein the transparent resin covers a top surface and a bottom surface of the valuable object and is spread over both sides of the body, so the transparent resin forms 1) an adherent interface between the at least two transparent films and the valuable object and 2) two adherent films between the at least two transparent films and the body, the transparent resin filling any space remaining in through aperture between the two transparent films.

15. A card according to claim 12, wherein the valuable object comprises a precious metal ingot.

16. A card according to claim 12, wherein the valuable object comprises a coin, medal, gem, or jewel.

* * * * *